May 8, 1934.  D. M. EVANS ET AL  1,957,449
PURIFICATION OF HYDROCARBON OILS
Filed March 19, 1930  2 Sheets-Sheet 1
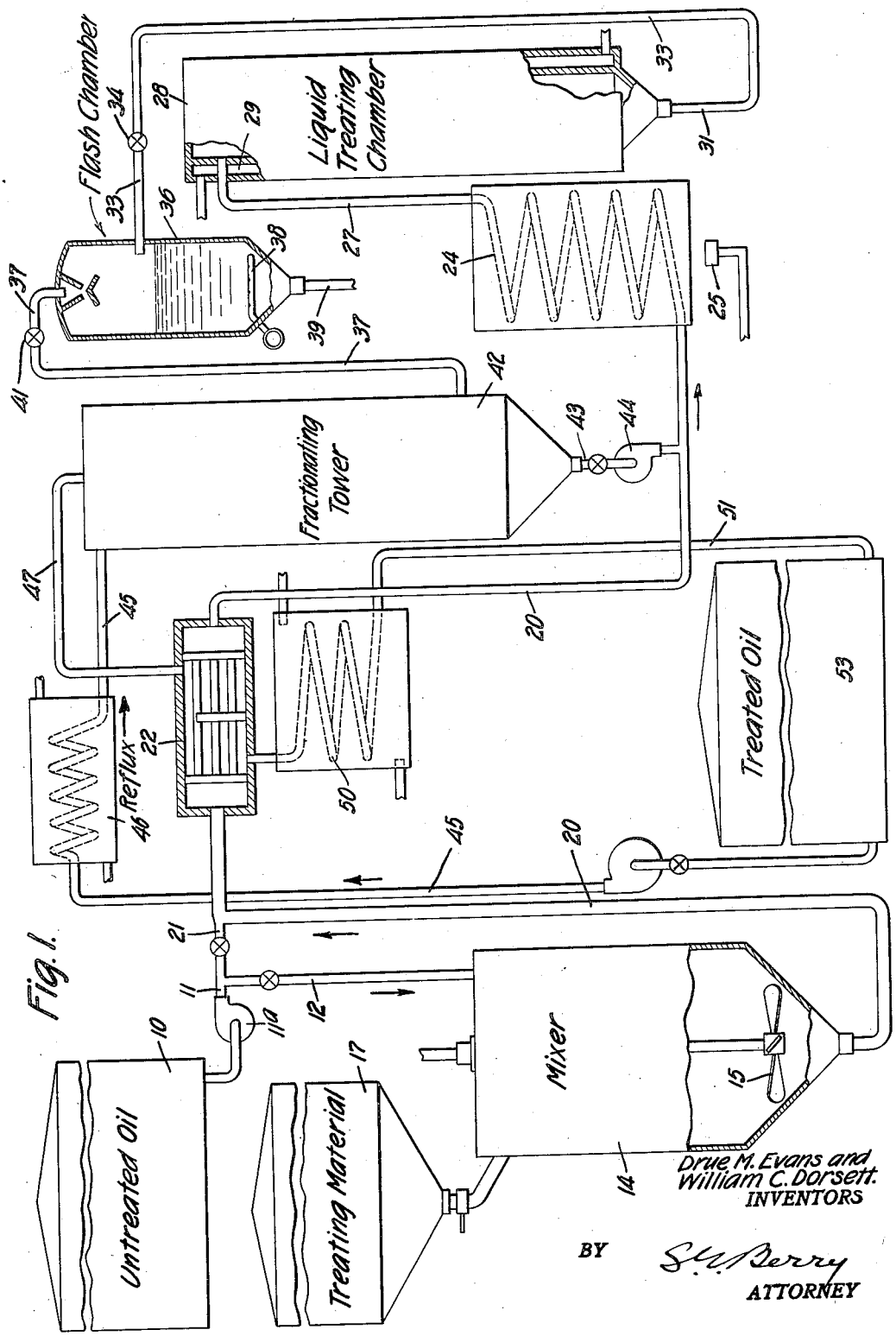
Drue M. Evans and
William C. Dorsett.
INVENTORS
BY S.V. Berry
ATTORNEY

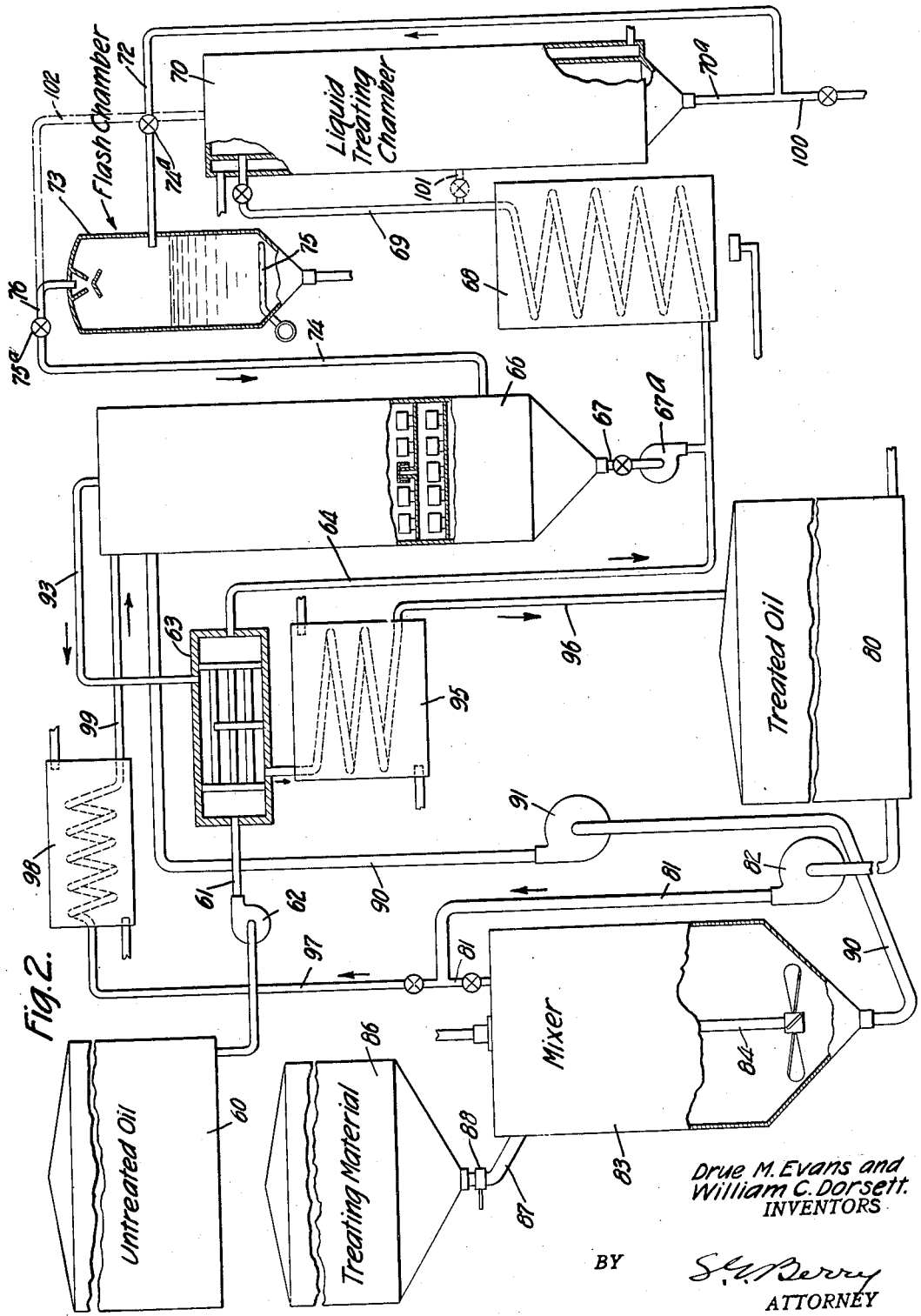

Patented May 8, 1934

1,957,449

UNITED STATES PATENT OFFICE 1,957,449

PURIFICATION OF HYDROCARBON OILS

Drue M. Evans and William C. Dorsett, Texas City, Tex., assignors to Petroleum Conversion Corporation, New York, N. Y., a corporation of Delaware Application March 19, 1930, Serial No. 436,929

11 Claims. (Cl. 196—79)

The present invention relates to improvements in the treatment of hydrocarbon oils for the purpose of removing undesirable substances therefrom. More particularly it relates to the treatment of oil with adsorbents such as fuller's earth and other clays, and while the invention is applicable either wholly or in part to hydrocarbon oils in general, it is particularly adapted for the treatment of raw gasoline distillates obtained by cracking processes for the removal of objectionable coloring matter, odor and gum-forming substances, etc. The invention seeks to provide a process in which the distillate will be subjected to the action of the adsorbent in the liquid phase at relatively high temperatures and the distillate separated from the treating material by distillation of the former, whereby the undesirable fractions and spent treating material are left together. Desirably, the raw distillate is so chosen that a sufficient quantity, say 10-15 per cent of fractions boiling above the desired endpoint, may be left as residue which will be sufficient to form a flux for the residual treating material and enable it to be readily drawn off from the treating chamber.

The invention further provides for rectifying the vapors released in the treating step in a suitable fractionating or rectifying tower, preferably with the return to the liquid treating zone of the fractions boiling above the desired endpoint of the finished product in order that sufficient heavier fractions may be present to constitute the flux for the spent treating material.

It has been found that treating the oil with the purifying agent in the liquid phase is the most efficient way of removing gum-forming constituents whereas treatment in the vapor phase is most effective in removing color, although treatment in either phase is at least partially effective with respect to either gum or color constituents. Furthermore, when dealing with oil containing fractions having a high volatility, excessive pressures may be developed if the optimum temperature for liquid phase treatment, having regard for the color removal, is used. Accordingly, it is a feature of our invention to combine both liquid and vapor phase treatments whereby the advantages of both methods may be realized. Our invention is also concerned with the manner of carrying out the vapor phase treatment whereby the vapors are continuously exposed to fresh treating material. Our preferred method of accomplishing this is to admit the vapors to be treated at the bottom of a fractionating tower, and a mixture of fresh treating material and purified distillate, the latter acting as a vehicle for the solid treating material, to the top of the tower, whereby the purified oil is re-distilled and releases the solid treating material which is thereupon brought into contact with the oil vapors introduced in the tower. In this manner the greatest treating force, so to speak, is applied where it will be most effective.

Further features consist of certain heat interchange steps by which the process is rendered more efficient as well as other improvements which will be apparent as the description proceeds and which will be pointed out in the appended claims.

Our invention will be best understood by reference to the following detailed description taken with the annexed drawings, in which Figure 1 is a diagrammatical showing of a plant embodying one form of our invention; and Figure 2 is a similar showing of a plant for carrying out a modified process in which oil material is also treated in the vapor phase.

Having reference now to Figure 1 of the drawings, a supply of untreated oil is contained in a tank 10, communicating with which is a draw-off 11 containing pump 11a and having a branch 12 constituting a by-pass leading to a mixing tank 14, preferably provided with a stirrer 15. A portion of the distillate and treating material, conveniently supplied from a container 17, are thoroughly mixed in said mixer. The suspension formed of the oil is led from the mixer 14 through a pipe 20 in which it is mixed with fresh untreated oil which is fed through the pipe 21, forming an extension of pipe 11. The mixture of the oil and treating material in the proper proportions is now passed preferably through a heat exchanger 22 and thence into a tubular heater 24 provided with an oil burner 25 or other suitable heating means. In this heater, the oil is raised to a temperature which experience will indicate as being the optimum, having regard for the vapor pressure of the lightest components and the limit of pressure which it is desirable to have. As an example of conditions which have proved satisfactory in practice, we may state that the temperature is maintained in the neighborhood of 400 to 500° F., it being understood that the pressure and temperature will depend chiefly upon the nature of the light ends contained in the distillate and the pressures will ordinarily vary between 200 and 300 #/in.$^2$.

The material so heated in the heater 24 is then passed through a pipe 27 into a liquid treating chamber 28 wherein the mixture is allowed to remain for a period of time, say one hour, for the purifying reaction to take place. Chamber 28 is provided with a steam jacket 29 for maintaining the temperature of the materials admitted thereto. By correctly proportioning the size of the chamber 28 to the other apparatus, the required time during which the temperature is held in the chamber will be had, since the rate of flow through the chamber is continuous and uniform. The thus heated sludge is then continuously withdrawn from the bottom of the chamber through pipe 31, is passed through pipe 33, thence thru a pressure regulator 34, and thence preferably into a flash drum 36. Here the desired fractions of the distillate will vaporize and pass out through pipe 37 while the unvaporized fractions together with the spent treating material will be let off through an outlet 39.

Desirably, a source of steam in the form of a pipe 38 communicates with the flash chamber 36 in order to admit steam thereto to facilitate evaporation and to insure that enough heat is present for vaporizing the desired components of the oil.

Vapor passes off from the drum 36 through pipe 37 which conducts it preferably through a pressure regulator 41 of known type to a fractionating tower 42. In tower 42 the vapor is further fractionated, the heavier fractions being removed through a pipe 43, pump 44 which preferably communicates with pipe 20 leading to heater 24 through which the material about to be treated is being passed in order that these fractions may be returned to the liquid treating chamber. For the purpose of maintaining the proper conditions in tower 42, a regulated supply of treated oil is admitted through a pipe 45 adjacent the top of the tower, provision being made for heating this reflux oil in the form of a heater 46 in case this is found necessary. Vapor is led from the tower through pipe 47 and is preferably passed through heat exchanger 22, already referred to, in which operation the heat in the vapors is imparted to the sludge about to enter the heater 24. From heat exchanger 22 the vapor is further passed through a condenser 50 and the condensate led therefrom through a pipe 51 to a treated oil container 53.

In the system described in the foregoing, it will be seen that oil to be treated is first suitably mixed with the treating material to form a sludge, is heated to an appropriate temperature, allowed to remain in the liquid treating chamber 28 for a considerable time interval, the pressure then released in the flash drum 36, and the produced vapor led to the fractionating column 31. The vapor led off from this tower is condensed and constitutes the treated product of the system.

We have illustrated a system in which provision is also made for treatment of the material in the vapor phase as well as in the liquid phase, whereby the system may be operated under a somewhat lower pressure.

Referring to Figure 2, oil in the tank 60 to be treated is passed therefrom through pipe 61, pump 62, thence through a heat interchanger 63, then through pipe 64, wherein it is additioned by the mixture of oil and treating material from fractionating tower 66 which passes through a pipe 67 connecting pipe 64 and having in its circuit a pump 67a. The mixture of oil to be treated and treating material now passes through a heater 68 wherein its temperature is raised to 400 degrees F., approximately, whereupon it is passed through a pipe 69 to a liquid treating chamber 70, similar to chamber 29 of Figure 1, and steam jacketed as shown. Here the oil is allowed to remain for a period of time, as for example an hour, is continuously led therefrom through a pipe 70a, pipe 72, which leads preferably to a flash chamber 73, a suitable pressure regulator 74a being provided prior to said chamber, as well as a similar regulator 75a on the further side of said chamber. As in the previous embodiment, a source of steam 75 is provided for admitting steam to the flash chamber to facilitate evaporation of the oil and to insure that sufficient heat is present to vaporize the desired components thereof. Vapor from chamber 73 now passes through a pipe 76 and regulator 75 to the lower portion of fractionating tower 66. Here the vapor is not only fractionated but it is caused to meet fresh treating material which is introduced into the tower in the following manner:

A portion of treated oil from a container 80 is passed by means of a pipe 81 and pump 82 to a chamber 83 provided with a stirrer 84 into which treating material from a container 86 is passed through a pipe 87 having a gate valve 88. The sludge thus formed is led from the mixing chamber 83 through a pipe 90 and pump 91 directly into the top of fractionating tower 66. Here the treated oil is vaporized and the treating material is released. The latter makes its way downward through the tower and meets the vapors from the flash chamber 73 which pass upwardly in a counter direction thereto. Such vapors thus contact with the fresh treating material and their objectionable components further removed.

The treated vapors leave the tower through pipe 93, pass through heat exchanger 63 wherein they impart heat to the untreated oil, thence into a condenser 95 and thence through pipe 96 into treated oil tank 80.

For the purpose of providing any necessary refluxing liquid to tower 66, we admit treated oil, preferably from container 80, which is fed therefrom through pipes 81 and 97, through a heater 98 and pipe 99, leading to the top of tower 66.

If desired, flash chamber 73 may be omitted and the tower 66 used to supply this function. In this case the material from heater 68 will be admitted to the liquid treating chamber 70 at a point in the lower portion thereof, as shown by the pipe 101 in dotted lines, while the vapors will be taken off from the top of the chamber through a valved pipe 102 which communicates with pipe 74. Exhausted treating material will then be continuously removed from the chamber 70 through pipe 100 communicating with the bottom of said chamber.

It will be evident from the foregoing that we have provided a process in which the vapors to be treated are continuously exposed to fresh treating material and that this process is applicable to the treatment of oils without the preliminary liquid phase treatment if it is desired to omit the latter. Furthermore, the liquid phase steps may be employed to the exclusion of the vapor phase and certain of the benefits of our invention had.

We claim:

1. The method of treating raw gasoline distillates which consists in forming a mixture of the distillates and the treating material comprising a solid, finely divided adsorbent, heating said mixture under sufficient pressure to maintain the oil material in the liquid phase and for a period and at a temperature sufficient to bring about substantial improvement of the oil material, releasing the pressure and distilling off the oil fractions but leaving sufficient residual distillates to form a flux for the used treating material, and subjecting the vaporized fractions to rectification and returning the heavy fractions to the zone wherein the mixture of oil and treating material is being heated.

2. The method of treating raw gasoline distillates which consists in forming a mixture of the distillates and the treating material comprising a solid, finely divided adsorbent, heating said mixture under sufficient pressure to maintain the oil material in the liquid phase and for a period and at a temperature sufficient to bring about substantial improvement of the oil material, and releasing the pressure and distilling off the gasoline fractions by aid of the heat imparted to the oil in said liquid phase treating step, admitting the produced vapors to a tower, also admitting thereto a mixture of treating material and purified distillate whereby said fresh distillate is brought into contact with said vapor to be treated.

3. The method of treating raw gasoline distillates which consists in forming a mixture of the distillates and the treating material comprising a solid, finely divided adsorbent, heating said mixture under sufficient pressure to maintain the oil material in the liquid phase and for a period and at a temperature sufficient to bring about substantial improvement of the oil material, and releasing the pressure and distilling off the oil fractions and admitting the vapor produced to a fractionating column and leading fractions from said column to a condenser and adding the residue from said column to the mixture of raw distillate and treating material about to be heated.

4. The method of treating raw cracked gasoline distillates which consists in mixing same with a treating material comprising a solid, finely divided adsorbent, heating the mixture while maintaining an autogenous pressure thereon until a substantial improvement in the oil material results, then releasing said pressure and distilling off the fractions of the final gasoline and subjecting the produced vapors to treatment with an adsorbent purifying material and condensing the vapors so treated.

5. The method of treating raw gasoline distillates which consists in mixing together said distillates and treating material comprising a solid, finely divided adsorbent, heating said mixture under sufficient pressure to maintain the oil material in the liquid phase and for a period sufficient to bring about a substantial improvement of the oil, then vaporizing the lighter fractions from said distillates, admitting the vaporized fractions into contact with a mixture of purified distillate and fresh treating material and adding the partially spent treating material from said admitting step to the material undergoing treatment in the liquid phase.

6. The method of treating raw gasoline distillates which consists in forming a mixture of said distillate and a treating material comprising a solid, finely divided adsorbent, heating said mixture under sufficient pressure to maintain the oil material in the liquid phase and for a period sufficient to bring about a substantial improvement of the oil, evaporating off the lighter desired fractions by releasing the pressure on the liquid oil, then contacting the so-generated vapors with fresh treating material.

7. The method of treating raw gasoline distillates with a treating material comprising a solid, finely divided adsorbent, to produce a treated gasoline of predetermined end boiling point, which consists in choosing such distillate of sufficiently high end boiling point above the end boiling point of the final gasoline as to leave a residue upon distillation to the end boiling point of said final gasoline sufficient to form a flux for the used treating material, forming a mixture of said raw distillates and said treating material, heating said mixture under sufficient pressure to maintain said raw distillates in the liquid phase and for a period and at a temperature sufficient to bring about substantial improvement of said distillates, and releasing the pressure and distilling said treated distillate down to said predetermined end boiling point, thereby recovering substantially all of the gasoline fractions down to said predetermined end point, and leaving said heavier fractions to act as a flux for the spent treating material.

8. The method of treating raw gasoline distillates in accordance with claim 7 in which the end boiling point of said raw gasoline distillates is chosen sufficiently above the said predetermined end boiling point of the final gasoline so as to leave a residue upon distillation of approximately 5-15%.

9. The method of treating raw gasoline distillates according to claim 7, in which the oil fractions are distilled off by flash evaporation.

10. The method of treating raw gasoline distillates to produce a final treated distillate of predetermined end boiling point, which consists in choosing such distillates of sufficiently high end boiling point above said predetermined end boiling point as to leave a residue upon distillation to said predetermined end boiling point of approximatey 5-15%, forming a mixture of the distillate and treating material comprising a solid, finely divided adsorbent, continuously heating said mixture in the liquid phase under the necessary pressure, continuously vaporizing the fractions from said mixture after such treatment has proceeded for a time interval sufficient to effect substantial improvement of the oil material, said fractions constituting substantially all of said treated gasoline of predetermined end boiling point minus losses due to the treating action, whereby a residue of the heavier distillates is left sufficient to form a flux for the used treating material, and continuously withdrawing said mixture of residue and spent treating material.

11. The method of treating raw gasoline distillates which consists in bringing in intimate contact in a vapor phase treating zone a stream of the vapor of said oil undergoing treatment, and a stream of fresh treating material comprising the solid, finely divided adsorbent in a vehicle of gasoline distillate, then after the vapor phase treatment is completed, withdrawing from said zone a flowable stream of residual oil and treating material, adding said stream to liquid distillates to be treated, heating the mixture in the liquid phase zone under the necessary pressure for a time interval and at a temperature sufficient to effect substantial improvement of the oil material, releasing the pressure and distilling off the oil fractions and admitting the produced vapor to said vapor phase treating zone to be treated with fresh treating material.

DRUE M. EVANS.
WILLIAM C. DORSETT.

DISCLAIMER 1,957,449. *Drue M. Evans* and *William C. Dorsett*, Texas City, Tex. PURIFICATION OF HYDROCARBON OILS. Patent dated May 8, 1934. Disclaimer filed July 8, 1938, by the assignee, *Petroleum Conversion Corporation*.

Hereby enters this disclaimer of claims 3 and 4 of said Letters Patent.

[*Official Gazette August 9, 1938.*]